United States Patent [19]

Lucas

[11] Patent Number: 5,616,639

[45] Date of Patent: Apr. 1, 1997

[54] TIRE WITH SILICA REINFORCED TREAD

[75] Inventor: Danielle Lucas, Welsdorf, Luxembourg

[73] Assignee: The Goodyear Tire & Rubber Company, Akron, Ohio

[21] Appl. No.: 449,864

[22] Filed: May 24, 1995

[51] Int. Cl.$^6$ ............................... C08L 9/00; B60C 1/00
[52] U.S. Cl. .................... 524/262; 524/492; 524/493; 524/495; 524/496; 524/860; 523/212; 523/213; 525/236; 525/237; 152/209 R
[58] Field of Search ........................ 524/262, 492, 524/493, 495, 496, 860; 525/236, 237; 523/212, 213; 152/209 R

[56] References Cited

U.S. PATENT DOCUMENTS

| | | | |
|---|---|---|---|
| 5,087,668 | 2/1992 | Standstrom et al. | 525/237 |
| 5,300,577 | 4/1994 | DiRossi et al. | 525/237 |
| 5,405,927 | 4/1995 | Hsu et al. | 525/237 |
| 5,504,140 | 2/1996 | Zanzig et al. | 525/237 |

FOREIGN PATENT DOCUMENTS

| | | | |
|---|---|---|---|
| 0620250 | 10/1994 | European Pat. Off. | C08K 3/36 |
| 0623650 | 11/1994 | European Pat. Off. | C08L 9/00 |

*Primary Examiner*—Paul R. Michl
*Assistant Examiner*—Olga Asinovsky
*Attorney, Agent, or Firm*—Henry C. Young, Jr.

[57] ABSTRACT

The invention relates to a tire with a rubber tread which is primarily reinforced with silica where the rubber of the said tread is composed of an elastomer base of at least three butadiene based synthetic rubbers comprised of two isoprene/butadiene copolymer elastomers having spatially defined Tg's, and a cis 1,4-polybutadiene elastomer.

12 Claims, No Drawings

1

TIRE WITH SILICA REINFORCED TREAD

FIELD

This invention relates to a tire having a rubber tread which is primarily reinforced with silica. In one aspect, the tread is comprised of a specified multiple component rubber blend reinforced with a quantitative amount of silica or a combination of silica and carbon black. In particular, the rubber of such tire tread is comprised of two isoprene/butadiene copolymer elastomers having spaced apart Tg's and a cis 1,4-polybutadiene elastomer having a cis 1,4-content in a range of about 90 to about 99 percent. Additional diene based elastomers can also be used in addition to the said three base elastomers.

BACKGROUND

Pneumatic rubber tires are conventionally prepared with a rubber tread which can be a blend of various rubbers which is typically reinforced with carbon black.

In one aspect, rubbers are evaluated, selected and blended for a purpose of achieving desired tire tread properties for various climatic and associated temperature conditions including a balance of tire tread characteristic properties and particularly tire performance on wet roads, snow and ice as well as acceptable treadwear.

For various applications utilizing rubber including applications such as tires and particularly tire treads, sulfur cured rubber is utilized which contains substantial amounts of reinforcing filler(s). Carbon black is commonly used for such purpose and normally provides or enhances good physical properties for the sulfur cured rubber. Particulate silica is also sometimes used for such purpose, particularly when the silica is used in conjunction with a coupling agent. In some cases, a combination of silica and carbon black is utilized for reinforcing fillers for various rubber products, including treads for tires.

It is important to appreciate that, conventionally, carbon black is considered to be a more effective reinforcing filler for rubber tire treads than silica if the silica is used without a coupling agent.

Indeed, at least as compared to carbon black, there tends to be a lack of, or at least an insufficient degree of, physical and/or chemical bonding between the silica particles and the rubber elastomers to enable the silica to become a reinforcing filler for the rubber for most purposes, including tire treads, if the silica is used without a coupler. While various treatments and procedures have been devised to overcome such deficiencies, compounds capable of interacting with both the silica surface and the rubber elastomer molecule, generally known to those skilled in such art as coupling agents, or couplers, are often used. Such coupling agents, for example, may be premixed, or pre-reacted, with the silica particles or added to the rubber mix during the rubber/silica processing, or mixing, stage. If the coupling agent and silica are added separately to the rubber mix during the rubber/silica mixing, or processing stage, it is considered that the coupling agent then combines in situ with the silica.

In particular, such coupling agents may be composed, for example, of a silane which has a constituent component, or moiety, (the silane portion) capable of reacting with the silica surface and, also, a constituent component, or moiety, capable of interacting with the rubber, particularly a sulfur vulcanizable rubber which contains carbon-to-carbon double bonds, or unsaturation. In this manner, then the coupler acts as a connecting bridge between the silica and the rubber and thereby enhances the rubber reinforcement aspect of the silica.

The rubber-interactive group component, or moiety, of the coupler may be, for example, one or more of groups such as mercapto, amino, vinyl, epoxy, and sulfur groups, preferably a sulfur or mercapto moiety and more preferably sulfur.

Numerous coupling agents are taught for use in combining silica and rubber such as, for example, silane coupling agents containing a polysulfide component, or structure such as, for example, bis-(trialkoxysilylalkyl) polysulfide having from 2 to about 6 sulfur atoms in the sulfur bridge such as, for example, bis-(3-triethoxysilylpropyl) tetrasulfide, trisulfide and disulfide. For example, see U.S. Pat. No. 3,873,489.

For silica reinforced tire treads, U.S. Pat. No. 5,066,721, in its Comparative Test Example 1 in Table 3 (column 15), discloses the use of solution polymerization prepared SBR containing 50 parts silica for a tire tread. Table 4 (column 17) illustrates the tire preparation. U.S. Pat. No. 5,227,425 discloses the use of a solution polymerization prepared SBR which is silica reinforced with a specified silica characterization and in which is preferenced over an emulsion polymerization prepared SBR. U.S. Pat. No. 4,519,430 discloses a silica rich tire tread which contains various elastomers with a mixture of silica and carbon black, with silica being required to be a major component of the silica/carbon black reinforcing filler.

It is intended that such aforesaid patent publications are incorporated herein by reference.

It is also known, prior to this invention, for a tire tread to be composed of (a) 10–50 phr of cis 1,4-polyisoprene natural rubber and (b) 50–90 phr of other diene rubbers selected from (i) isoprene/butadiene rubber having a Tg of from $-70°$ C. to $-100°$ C. (IBR-A) and (ii) other diene rubber having a Tg of from $-5°$ C. to $-30°$ C. selected from, for example, isoprene/butadiene rubber (IBR-B), cis 1,4-butadiene rubber, 3,4-polyisoprene rubber, styrene/butadiene rubber, styrene/isoprene rubber and cis 1,4-polyisoprene natural rubber; wherein it is required that the Tg of the IBR-A is at least $40°$ C. lower than the Tg's of the "other diene rubber", including the IBR-B. The terms "IBR-A" and "IBR-B" are added herein for clarity.

The term "phr" where used herein, and according to conventional practice, refers to parts of a respective material per 100 parts by weight or rubber, or elastomer.

In the description of this invention, the terms "rubber" and "elastomer", where used herein unless otherwise prescribed, are used interchangeably. The terms "rubber composition", "compounded rubber" and "rubber compound" where used herein unless otherwise prescribed, are used interchangeably to refer to rubber which has been blended or mixed with various ingredients or materials and such terms are well known to those having skill in the rubber mixing, or rubber compounding, art.

The Tg of a polymer, particularly an elastomer, as used herein unless otherwise prescribed, refers to its glass transition temperature which can conventionally be determined, for example, by a differential scanning calorimeter at a heating rate of $15°$ C., usually alternatively at about $10°$ C., per minute to an observed transition of the absorbed energy versus time curve. It is understood that such Tg determination is well known to those having skill in such art.

SUMMARY AND PRACTICE OF THE INVENTION

In accordance with this invention, a pneumatic tire is provided having a rubber tread comprised of, based on 100 parts by weight rubber, (A) at least three diene-based elastomers comprised of (i) about 20 to about 50, preferably about 30 to about 40, phr isoprene/butadiene copolymer rubber (IBR-1) containing about 20 to about 60 percent isoprene and having a Tg of about −35° C. to about −50° C., (ii) about 20 to about 50, preferably about 15 to about 40, of isoprene/butadiene copolymer rubber (IBR-2) containing about 15 to about 40 percent isoprene and having a Tg of about −65° C. to about −90° C., wherein the Tg of said IBR-2 is at least 30° C. lower than the Tg of said IBR-1, and (iii) about 20 to about 50, preferably about 20 to about 40, phr of a cis 1,4-polybutadiene rubber (cis-BR) having a cis content in a range of about 90 to about 99 percent and a Tg in a range of about −85° C. to about −105° C., (B) about 30 to about 110, preferably about 50 to about 100, phr particulate silica, (C) at least one silica coupler having a silane moiety reactive with the surface of the silica and a moiety interactive with said elastomers, in a weight ratio of silica to coupler of about 8/1 to about 20/1, and (D) about 5 to about 50, alternatively, about 5 to about 30, phr carbon black, wherein the weight ratio of silica to carbon black is at least 1/1, preferably in a range of about 4/1 to about 20/1 and where the total of silica and carbon black is about 50 to about 120, preferably about 70 to about 105 phr.

The said tread rubber may also contain from about 5 to about 30, alternatively about 5 to about 20, phr of at least one additional elastomer having a Tg in a range of about −20° C. to about −70° C. selected from at least one of medium vinyl polybutadiene (MVBR) with vinyl content in a range of 30 to 55 percent, high vinyl butadiene (HVBR) with vinyl content in a range of 55 to 75 percent; 3,4-polyisoprene having a Tg in a range of about −20° C. to about −50° C. and cis 1,4-polyisoprene, natural or synthetic, preferably natural. It is to be acknowledged that within the aforesaid −20° C. to −70° C. temperature range, the 3,4-polysioprene would more typically have a Tg in a range of about −20° C. to about −50° C. and the cis 1,4-polyisoprene, would more typically have a Tg in a range of about −60° C. to about −70° C.

The rubber blends containing the said at least three synthetic butadiene based rubbers is an important feature of the invention designed to enhance properties of a tire tread containing silica reinforcement and particularly tire treads having a silica/carbon black reinforcing filler composed of a substantial content of silica.

In one aspect, the isoprene/butadiene copolymer rubber (IBR-1) is required to have an isoprene content of about 20 to about 60 percent and a Tg in a range of about −35° C. to about −50° C. and isoprene/butadiene copolymer rubber (IBR-2) is required to have an isoprene content of about 15 to about 40 percent and a Tg in a range of about −65° C. to about −90° C.

The utilization of the IBR-1 with a Tg range of −35° C. to −50° C. is considered herein to be an important aspect of this invention for promoting wet handling for the tire tread while not having a negative effect on winter performance. It is particularly desired to provide a satisfactory balance between wet handling, treadwear and winter performance. Such properties are desirable for tires which are intended to be driven under winter conditions.

Indeed, it is considered herein that such a Tg range of −35° C. to −50° C. for the IBR-1 is a significant requirement over an IBR having a Tg range of about −5° C. to about −30° C. for the tire tread of this invention. The vulcanized rubber composition of this invention containing the IBR with Tg of −35° C. to −50° C. is considered herein to retain its flexibility at temperatures well below 0° C. It is considered herein that utilization of an IBR with Tg of about −5° C. to about −30° C., would be comparatively unacceptable because it is expected that a tire tread made with such IBR would stiffen, or loose its flexibility at relatively low atmospheric temperatures.

Further, the Tg's of IBR-1 and IBR-2 are required to be spaced apart by at least 30° C., namely, the Tg of the IBR-2 is required to be at least 30° C. lower than the Tg of the IBR-1. For example, then, if the Tg of the IBR-1 is −45° C. then the Tg of the IBR-2 is required to be at least 30° C. lower, or in a range of about −75° C. to about −90° C. Indeed by selection of the aforesaid three elastomers, it is considered herein that the Tg's of the IBR-1 and IBR-2 need to be spaced apart by at least 30° C. to achieve a partial incompatibility of the IBR's so that both IBR elastomers substantially retain their individual specific viscoelastic properties and that the blend does not have intermediate viscoelastic properties.

In the practice of this invention, a contribution of the IBR-1 is believed to enhance or promote the tire tread's wet handling, or wet grip as it may sometimes be called, and a contribution of the IBR-2 is believed to enhance or promote the tire tread's treadwear and aforesaid winter performance.

The utilization of the two isoprene/butadiene copolymer rubbers (IBR's) with their required spatially defined Tg's, namely, the requirement that their Tg's be at least 30° C. apart is considered herein to be significant and beneficial because it is considered herein that such copolymers with the aforesaid spatially defined Tg's are relatively incompatible, or at least partially incompatible, in a sense that each copolymer, or rubber, substantially maintains its individual viscoelastic properties as a function of temperature and deformation frequency and approximately retain their individual Tg's whereas other elastomers with less spaced apart Tg's and a higher compatibility with each other would form a blend with intermediate properties and Tg's as compared to the required base elastomers for the blend of elastomers for this invention. Such phenomenon is believed to be well understood by one having skill in such art.

The said cis 1,4-polybutadiene rubber (cis-BR) with its Tg in a range of about −85° C. to about −105° C. is believed to be beneficial to enhance the tire treadwear. The cis-BR for the basic three elastomer tire tread typically has a cis 1,4-content in a range of about 90 to about 99 percent and usually at least 93 percent.

The optional use of about 5 to about 30 phr of an additional diene based elastomer having a Tg in a range of about −20° to about −70° C. selected, for example, from 3,4-polyisoprene, MVBR, HVBR and cis 1,4-polyisoprene as a part of this invention is considered herein to be an additional tool to enhance the uncured elastomer blend processability and/or to adjust the tire performance balance such as, for example, wet handling versus winter performance.

The use of cis 1,4-polyisoprene rubber, particularly and preferably as natural rubber, in tire treads is well known to those having skill in the such art.

Thus, in the practice of this invention, a balanced rubber blend of at least three synthetic diene based rubbers is provided which relies upon silica reinforcement which, in turn, relies on a silica coupler for the silica's reinforcing effect for the rubber blend.

The commonly employed siliceous pigments used in rubber compounding applications can be used as the silica in this invention, including pyrogenic and precipitated siliceous pigments (silica), although precipitate silicas are preferred.

The siliceous pigments preferably employed in this invention are precipitated silicas such as, for example, those obtained by the acidification of a soluble silicate, e.g., sodium silicate.

The siliceous pigment (silica) may, for example, have an ultimate particle size in a range of 50 to 10,000 angstroms, preferably between 50 and 400 angstroms. The BET surface area of the pigment, as measured using nitrogen gas, is in a range of about 80 to about 300, although more usually in a range of about 100 to about 200, although perhaps even up to about 360, square meters per gram. The BET method of measuring surface area is described in the *Journal of the American Chemical Society*, Volume 60, page 304 (1930).

The silica also typically has a dibutylphthalate (DBP) absorption value in a range of about 150 to about 350, and usually about 200 to about 300.

The silica might, for example, have an average ultimate particle size, for example, in a range of about 0.01 to 0.05 micron as determined by the electron microscope, although the silica particles may be even smaller in size.

Various commercially available silicas may be considered for use in this invention such as, for example only and without limitation, silicas commercially available from PPG Industries under the Hi-Sil trademark with designations 210, 243, etc; silicas available from Rhone-Poulenc, such as, for example, Zeosil 1165MP and silicas available from Degussa AG with designations such as, for example, VN2, VN3, BV 3370GR and Hubersil 8745 from J. M. Huber company. The aforesaid BV 3370GR and Zeosil 1165MP silicas are considered herein to be of particular consideration.

It is readily understood by those having skill in the art that the rubber composition of the tread rubber would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, and plasticizers, fillers, pigments, fatty acid, zinc oxide, waxes, antioxidants and antiozonants, peptizing agents and reinforcing materials such as, for example, silica and carbon black. As known to those skilled in the art, depending on the intended use of the sulfur vulcanizable and sulfur vulcanized material (rubbers), the additives mentioned above are selected and commonly used in conventional amounts.

Typically additions of carbon black and silica, for this invention are hereinbefore set forth. Various carbon blacks, particularly rubber reinforcing blacks might be used. For example, although such examples are not intended to be limitive, are of the ASTM designation type N-299, N-234, N-220, N-134, N-115, and N-110. The selection of the type of carbon black is well within an optimization skill by one having skill in the rubber compounding are for tire treads, depending somewhat upon the intended use, purpose and properties for the tire tread. Typical amounts of tackifier resins, if used, comprise about 0.5 to about 10 phr, usually about 1 to about 5 phr. Typical amounts of processing aids comprise about 1 to about 60 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to 5 phr. Typical amounts of fatty acids, if used, which can include stearic acid comprise about 0.5 to about 4 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, with a range of from about one to about 2.5, being preferred.

Accelerators are used to control the time and/or temperature required for vulcanization and to improve the properties of the vulcanizate. Retarders are also used to control the vulcanization on-set. In one embodiment, a single accelerator system may be used, i.e., primary accelerator. Conventionally and preferably, a primary accelerator(s) is used in total amounts ranging from about 0.5 to about 4, preferably about 0.8 to about 2.5, phr. In another embodiment, combinations of a primary or and a secondary accelerator might be used, with the secondary accelerator being used in amounts of about 0.05 to about 3 phr, for example, in order to activate the cure and to improve the properties of the vulcanizate. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not considered to be an aspect of this invention which is more primarily directed to the use of silica as a reinforcing filler in combination with a coupling agent in a prescribed rubber blend.

The presence and relative amounts of the above additives are not considered to be an aspect of the present invention, unless otherwise prescribed herein, which is more primarily directed to the utilization of specified blends of rubbers in tire treads, in combination with silica and silica coupler.

The tire can be built, shaped, molded and cured by various methods which will be readily apparent to those having skill in such art.

The invention may be better understood by reference to the following examples in which the parts and percentages are by weight unless otherwise indicated.

EXAMPLE I

Rubber compositions (compounded rubber) were prepared of various blends of isoprene/butadiene copolymer rubbers (IBR-1 and IBR-2), cis 1,4-polybutadiene rubber (cis-BR) and, optionally, medium vinyl polybutadiene (MVPBd) and referred to herein as Samples A, B and C.

A control rubber composition composed of emulsion polymerization prepared styrene/butadiene copolymer rubber (E-SBR) and cis 1,4-polybutadiene rubber and cis 1,4-polyisoprene natural rubber (NR) was prepared and identified herein as Sample X.

The rubber compositions were prepared by mixing the ingredients in several sequential non-productive mixing stages (without the curatives) and a final productive mixing stage (basically for the curatives), then the resulting composition was cured under conditions of elevated temperature and pressure.

For the non-productive mixing stages, exclusive of the accelerator(s), sulfur curatives, and antioxidant which are added in the final, productive mixing stage, all of the ingredients were mixed in the first non-productive stage except for about 20 to about 50 percent of the reinforcing fillers (silica or carbon black), with proportional amounts (to the reinforcing fillers) of coupler and processing oil, which were added in the second and third non-productive mixing stage. The ingredients were mixed in each of the non-productive mixing stages for about 5 minutes to a temperature of about 165° C., all in a Banbury internal type of mixer.

To the resulting rubber composition (mixture) was then mixed, in the final, productive mixing stage, the remaining ingredients in a Banbury internal type mixer for about 2 minutes to a temperature of about 110° C.

The rubber was then used to prepare a tire tread and the tire carcass and tread assembly vulcanized.

The rubber composition was comprised of the ingredients illustrated in Table 1. The values, for the most part, are simply rounded to the nearest whole number.

TABLE 1

| Sample # | A | B | C | X |
|---|---|---|---|---|
| Non-Productive Mix Stages | | | | |
| IBR-1[1] | 35 | 33 | 0 | 0 |
| IBR-2[2] | 30 | 32 | 30 | 0 |
| E-SBR[3] (incl. oil) | | | | 48 |
| cis-BR[4] (incl oil) | 43.8 | 43.8 | 37.5 | 43.8 |
| MVBR[5] (incl oil) | 0 | 0 | 28 | 0 |
| Natural Rubber[6] | | | | 30 |
| Processing Oil, aromatic | 41 | 41 | 35 | 28 |
| Fatty Acid | 3 | 3 | 3 | 3 |
| Silica[7] | 85 | 85 | 85 | 85 |
| Plasticizers, resins and waxes | 3.5 | 3.5 | 3.5 | 3.5 |
| Coupling Agent[8] | 13.6 | 13.6 | 13.6 | 13.6 |
| Productive Mix Stage | | | | |
| Zinc Oxide | 2.5 | 2.5 | 2.5 | 2.5 |
| Antioxidants[9] | 2.5 | 2.5 | 2.5 | 2.5 |
| Sulfur | 1.4 | 1.4 | 1.4 | 1.4 |
| Sulfenamide and Guanidine type accelerators | 4 | 4 | 4 | 4 |

[1]An isoprene/butadiene copolymer rubber obtained from The Goodyear Tire & Rubber Company having an isoprene content of about 50% and a Tg of about −45° C.
[2]An isoprene/butadiene copolymer rubber obtained from The Goodyear Tire & Rubber Company having an isoprene content of about 30% and a Tg of about −85° C.
[3]An emulsion polymerization prepared styrene/butadiene copolymer rubber containing about 23 percent styrene as Plioflex 1712 from The Goodyear Tire & Rubber Company. The rubber contained 37.5 phr of rubber processing oil.
[4]Cis 1,4-polybutadiene rubber obtained as Budene ® 1254 from The Goodyear Tire & Rubber Company having a cis content of about 95 percent and a Tg of about −98° C. The rubber contained 25 phr of rubber processing oil.
[5]Medium vinyl polybutadiene, containing about 53 percent vinyl, as Budene ® 1255 from The Goodyear Tire & Rubber Company and having a Tg of about −55° C. The rubber contained 37.5 phr of rubber processing oil.
[6]Natural rubber (cis 1,4-polyisoprene) having a Tg of about −62° C.;
[7]A silica obtained as Zeosil 1165 MP from Rhone Poulenc.

TABLE 1-continued

| Sample # | A | B | C | X |
|---|---|---|---|---|

[8]obtained as bis-3-triethoxysilylpropyl) tetrasulfide (50% active) commercially available as X50S from Degussa as a 50/50 blend of the tetrasulfide with N330 carbon black (thus, considered 50% active). Technically, the tetrasulfide is believed to be an organosilane polysulfide as a composite, or mixture, having an average number of sulfur atoms in a polysulfide bridge in a range of about 3.5 to about 4 connecting sulfur atoms, although the composite, or mixture may contain individual organosilane polysulfides with about 2 to about 8 connecting sulfur atoms.
[9]Of the diarylparaphenylene diamine and dihydro-trimethylquinoline type 1) An isoprene/butadiene copolymer rubber obtained from The Goodyear Tire & Rubber Company having an isoprene content of about 50% and a Tg of about −45° C.

2) An isoprene/butadiene copolymer rubber obtained from The Goodyear Tire & Rubber Company having an isoprene content of about 30% and a Tg of about −85° C.

3) An emulsion polymerization prepared styrene/butadiene copolymer rubber containing about 23 percent styrene as Plioflex 1712 from The Goodyear Tire & Rubber Company. The rubber contained 37.5 phr of rubber processing oil.

4) Cis 1,4-polybutadiene rubber obtained as Budene® 1254 from The Goodyear Tire & Rubber Company having a cis content of about 95 percent and a Tg of about −98° C. The rubber contained 25 phr of rubber processing oil.

5) Medium vinyl polybutadiene, containing about 53 percent vinyl, as Budene® 1255 from The Goodyear Tire a Rubber Company and having a Tg of about −55° C. The rubber contained 37.5 phr of rubber processing oil.

6) Natural rubber (cis 1,4-polyisoprene) having a Tg of about −62° C.;

7) A silica obtained as Zeosil 1165 MP from Rhone Poulenc.

8) obtained as bis-3-triethoxysilylpropyl) tetrasulfide (50% active) commercially available as X50S from Degussa as a 50/50 blend of the tetrasulfide with N330 carbon black (thus, considered 50% active). Technically, the tetrasulfide is believed to be an organosilane polysulfide as a composite, or mixture, having an average number of sulfur atoms in a polysulfide bridge in a range of about 3.5 to about 4 connecting sulfur atoms, although the composite, or mixture may contain individual organosilane polysulfides with about 2 to about 8 connecting sulfur atoms.

9) Of the diarylparaphenylene diamine and dihydro-trimethylquinoline type

EXAMPLE II

Tires of size 195/165R15 where produced with treads of rubber compositions shown as Samples A and X of Example I herein as demonstrated in Table 1 and correspondingly identified as tires A and X.

The tires were tested by conventional tire testing procedures with results shown in the following Table 2. The Control tire for this Example is Tire X, which utilized the Sample X rubber composition referenced in Example I herein. The values for the Control Tire X were normalized to values of 100 and the associated values for Tire A is recited with values comparative to the values for the Control Tire X. The higher rating indicates better performance.

TABLE 2

| Test Values | Tire X (Cntrl) | Tire A |
| --- | --- | --- |
| Wet skid resistance | 100 | 102 |
| Rolling resistance | 100 | 103 |
| Treadwear | 100 | 111 |

These values demonstrate that the tires which utilized the tread rubber compositions of this invention have improved rolling resistance, wet skid resistance and treadwear.

EXAMPLE III

Tires of size 195/65R15 were produced with treads of rubber compositions shown as Sample B and X in Table 1 and correspondingly identified herein as Tires B and X.

The tires were tested by conventional tire testing procedures with results shown in the following Table 3. The control tire for this Example in Tire X which utilized the Sample X rubber composition referenced in Example I herein. The values for the Control Tire X were normalized to values of 100 and the values for tire B compared thereto.

TABLE 3

| Test Values Tread Compund | Tire X (Cntrl) Sample X | Tire B Sample B |
| --- | --- | --- |
| Wet Skid Resistance | 100 | 97 |
| Wet Handling | 100 | 100 |
| Rolling Resistance | 100 | 101 |
| Treadwear | 100 | 113 |
| Snow Performance | 100 | 104 |
| Ice Performance | 100 | 100 |

In general, the winter performance is a combination of subjective and objective tests in which test tires are mounted on rims and inflated to operating pressure to form a tire/rim assembly and four of such assemblies mounted as wheels on a test vehicle. The vehicle is driven by an experienced driver over natural snow or ice conditions, as the case may be, and an evaluation of the tire made by the driver as to the performance of the tire for acceleration, braking and handling.

The snow performance test was a combination of subjective and objective tests performed by a trained test driver and is a test of acceleration, braking and handling on natural snow.

The ice performance test was a subjective and objective test performed by a trained test driver and is a test of acceleration, braking and handling on natural ice.

These values demonstrate that the tire which utilized the tread composition of this invention has improved treadwear and snow performance with only a small loss of wet skid resistance and an equivalent wet handling. Thus, a tire is provided which has a balance of properties especially suited for driving under winter conditions, such as better snow performance while having equivalent wet handling.

EXAMPLE IV

Tires of size 195/65R15 were produced with treads of rubber compositions shown as Samples B & C in Table 1 and correspondingly identified herein as Tires B and C.

For this test, the tread compound, Sample B, was used as control and its performance normalized at 100. The values for Tire C were compared thereto.

TABLE 4

| Test Values Tread Compound | Tire B Sample B | Tire C Sample C |
| --- | --- | --- |
| Wet Skid Resistance | 100 | 103 |
| Rolling Resistance | 100 | 100 |
| Treadwear | 100 | 105 |

These values demonstrate that the tire which utilized the tread composition of this invention can be tuned according to the performance requirement by variation of the polymer blend components to improve wet skid resistance and treadwear without losses in rolling resistance.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire is provided having a rubber tread comprised of, based on 100 parts by weight rubber, (A) three diene-based elastomers comprised of, based on the rubber of the tread, (i) about 20 to about 50 phr of isoprene/butadiene copolymer rubber (IBR-1) containing about 20 to about 60 percent isoprene and having a Tg of about −35° to about −50° C., (ii) about 20 to about 50 phr of isoprene/butadiene copolymer rubber (IBR-2) containing about 15 to about 40 percent isoprene and having a Tg of about −65° C. to about −90° C.; wherein the Tg of said IBR-2 is at least 30° C. lower than the Tg of said IBR-1, and (iii) about 20 to about 50 phr of cis 1,4-polybutadiene rubber (cis-BR rubber) having a cis content of about 90 to about 99 percent and a Tg in a range of about −85° C. to about 105° C., (B) about 30 to about 110 phr particulate, precipitated silica, (C) at least one silica coupler having a silane moiety reactive with the surface of the silica and a moiety interactive with said elastomer, in a weight ratio of silica to coupler of about 8/1 to about 20/1, and (D) about 5 to about 50 phr carbon black, wherein the weight ratio of silica to carbon black is at least 1/1 and where the total of silica, and carbon black is about 40 to about 120 phr.

2. The tire of claim 1 where said silica is characterized by having a BET surface area in a range of about 80 to about 360 and a DBP absorption value in a range of about 150 to about 350.

3. The tire of claim 1 where the tread contains both silica and carbon black and the weight ratio of silica to carbon black is at least 10/1.

4. The tire of claim 1 where the tread contains both silica and carbon black and the weight ratio of silica to carbon black is in a range of about 4/1 to about 20/1.

5. The tire of claim 1 where said tread rubber also contains about 5 to about 30 phr of at least one additional elastomer having a Tg in a range of about −20° C. to about −70° C. selected from at least one of medium vinyl polybutadiene (MVBR) with vinyl content in a range of 30 to 55 percent, high vinyl butadiene (HVBR) with vinyl content in a range of 55 to 75 percent; 3,4-polyisoprene having a Tg in a range of about −20° C. to about −50° C. and cis 1,4-polyisoprene having a Tg in a range of about −60° C. to about −70° C.

6. The tire of claim 1 where, for said tread the said silica and carbon black reinforcing fillers are utilized as (i) silica in an amount of about 50 to about 100 phr with amounts of carbon black in a range of about 5 to about 30 phr with a total of silica and carbon black in a range of about 70 to about 105.

7. The tire of claim 1 where the said coupler is a bis-(trialkoxysilylalkyl) polysulfide having from 2 to about 8 connecting sulfur atoms in its sulfur bridge.

8. The tire according to claim 7 wherein said polysulfide is a bis-3-(triethoxysilylpropyl) polysulfide having an average of about 3.5 to about 4 connecting sulfur atoms in its sulfur bridge.

9. The tire of claim 1 where said silica is characterized by having a BET surface area in a range of about 100 to about 200 and a DBP absorption value in a range of about 200 to about 300, where the silica to carbon black weight ratio is in a range of about 4/1 to about 20/1.

10. The tire of claim 9 where said tread rubber also contains about 5 to about 30 phr of at least one additional elastomer having a Tg in a range of about $-20°$ C. to about $-70°$ C. selected from at least one of medium vinyl polybutadiene (MVBR) with vinyl content in a range of 30 to 55 percent, high vinyl butadiene (HVBR) with vinyl content in a range of 55 to 75 percent; 3,4-polyisoprene having a Tg in a range of about $-20°$ C. to about $-50°$ C. and cis 1,4-polyisoprene having a Tg in a range of about $-60°$ C. to about $-70°$ C.

11. The tire of claim 9 where said coupler is a bis-(trialkoxysilylalkyl) polysulfide having from 2 to about 8 connecting sulfur atoms in its sulfur bridge.

12. The tire of claim 10 where said coupler is a bis-(trialkoxysilylalkyl) polysulfide having from 2 to about 8 connecting sulfur atoms in its sulfur bridge.

* * * * *